United States Patent
Ljolje (10) Patent No.: US 8,532,993 B2
(45) Date of Patent: *Sep. 10, 2013

(54) SPEECH RECOGNITION BASED ON PRONUNCIATION MODELING

(75) Inventor: Andrej Ljolje, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,996

(22) Filed: Jul. 2, 2012

(65) Prior Publication Data

US 2012/0271635 A1 Oct. 25, 2012

Related U.S. Application Data

(63) Continuation of application No. 11/380,502, filed on Apr. 27, 2006, now Pat. No. 8,214,213.

(51) Int. Cl.
*G10L 15/02* (2006.01)
*G10L 15/04* (2006.01)
*G10L 15/06* (2006.01)
*G10L 15/20* (2006.01)

(52) U.S. Cl.
USPC ........... 704/251; 704/253; 704/254; 704/255; 704/256; 704/257; 704/240

(58) Field of Classification Search
USPC .......................... 704/251, 246, 253–257, 240
See application file for complete search history.

(56) References Cited

U.S. PATENT DOCUMENTS

| | | | |
|---|---|---|---|
| 5,581,655 A * | 12/1996 | Cohen et al. | 704/245 |
| 5,636,325 A | 6/1997 | Farrett | |
| 5,864,810 A | 1/1999 | Digalakis et al. | |
| 6,076,053 A * | 6/2000 | Juang et al. | 704/236 |
| 6,088,669 A | 7/2000 | Maes | |
| 6,161,087 A | 12/2000 | Wightman et al. | |
| 6,272,464 B1 * | 8/2001 | Kiraz et al. | 704/257 |
| 6,360,237 B1 * | 3/2002 | Schulz et al. | 715/255 |
| 6,389,394 B1 | 5/2002 | Fanty | |
| 6,456,971 B1 | 9/2002 | Mohri et al. | |
| 6,675,143 B1 | 1/2004 | Barnes et al. | |
| 7,181,395 B1 * | 2/2007 | Deligne et al. | 704/249 |
| 7,216,079 B1 * | 5/2007 | Barnard et al. | 704/244 |
| 7,292,979 B2 | 11/2007 | Karas et al. | |
| 7,467,087 B1 * | 12/2008 | Gillick et al. | 704/260 |
| 7,620,550 B1 | 11/2009 | Gupta et al. | |
| 7,860,707 B2 * | 12/2010 | Yu et al. | 704/4 |
| 7,925,506 B2 | 4/2011 | Farmaner et al. | |
| 2002/0048350 A1 | 4/2002 | Phillips et al. | |
| 2002/0111805 A1 * | 8/2002 | Goronzy et al. | 704/250 |
| 2002/0116191 A1 * | 8/2002 | Olsen et al. | 704/251 |
| 2002/0128820 A1 * | 9/2002 | Goronzy et al. | 704/10 |
| 2003/0009335 A1 | 1/2003 | Schalkwyk et al. | |
| 2003/0105632 A1 | 6/2003 | Huitouze et al. | |
| 2003/0225578 A1 | 12/2003 | Kahn et al. | |
| 2004/0006470 A1 | 1/2004 | Kobayashi | |
| 2004/0172247 A1 | 9/2004 | Yoon et al. | |
| 2005/0102142 A1 * | 5/2005 | Soufflet et al. | 704/246 |

(Continued)

*Primary Examiner* — Pierre-Louis Desir
*Assistant Examiner* — Abdelali Serrou (57) ABSTRACT

A system and method for performing speech recognition is disclosed. The method comprises receiving an utterance, applying the utterance to a recognizer with a language model having pronunciation probabilities associated with unique word identifiers for words given their pronunciations and presenting a recognition result for the utterance. Recognition improvement is found by moving a pronunciation model from a dictionary to the language model.

20 Claims, 5 Drawing Sheets

(56) References Cited

U.S. PATENT DOCUMENTS

| | | |
|---|---|---|
| 2005/0119885 A1* | 6/2005 | Axelrod et al. ............... 704/231 |
| 2005/0143972 A1 | 6/2005 | Gopalakrishnan et al. |
| 2005/0192793 A1* | 9/2005 | Cote et al. ..................... 704/4 |
| 2005/0222843 A1 | 10/2005 | Kahn et al. |
| 2006/0074659 A1 | 4/2006 | Adams et al. |
| 2006/0100871 A1* | 5/2006 | Choi et al. .................... 704/254 |
| 2006/0149558 A1 | 7/2006 | Kahn et al. |
| 2006/0190249 A1 | 8/2006 | Kahn et al. |
| 2007/0033044 A1* | 2/2007 | Yao ............................ 704/256.3 |

* cited by examiner

SPEECH RECOGNITION BASED ON PRONUNCIATION MODELING

PRIORITY INFORMATION

The present application is a continuation of U.S. patent application Ser. No. 11/380,502, filed Apr. 27, 2006, the contents of which is incorporated herein by reference in its entirety.

RELATED APPLICATIONS

The present application is related to U.S. application Ser. No. 11/380,510, filed Apr. 27, 2006 and U.S. application Ser. No. 11/380,516, filed Apr. 27, 2006, both of which are incorporated herein by reference.

BACKGROUND OF THE INVENTION

1. Field of the Invention

The present invention relates to speech recognition and more specifically to various embodiments related to using pronunciation dependent language models and word clusters in the context of speech recognition.

2. Introduction

Historically, speech recognition started by attempting to solve the easiest, yet important, recognition tasks. For example, a spoken dialog system may ask a user to say "yes" or "no" in response to a question and the system will recognize the utterance and act accordingly. In a more complex dialog system and user may state something like "I want my account balance" and the system will attempt to identify the task—which is to present the user with the account balance. Those tasks invariably had simple language models which are small vocabularies associated with well-defined applications. Examples include digit recognition, alphabet recognition or simple lists of commands. Given the scope of the tasks, it was easy to collect training data that allowed whole word acoustic models which more recently became either context dependent whole word models or context dependent head-body-tail word fraction models. As the size and scope of the recognition tasks grew, the ability to provide such training data coverage diminished, and context dependent sub-word units became the acoustic units of choice.

In all of these cases, the basic unit for building the language models had always been the basic lexical unit, the word. In rare cases this model for the structure of the recognition system was broken, mostly to try to account for major pronunciation changes due to heavy coarticulation that occurs in some short phrases, which would be given a new lexical entry and appropriate dictionary entry accounting for the pronunciation changes from the baseline phonemic baseforms. In the language modeling domain, many have attempted to model short frequent phrases as lexical items which were mostly successful, although not always successfully. In recent years the ability and willingness to collect ever more transcribed speech, albeit that the transcriptions were often noisy due to the need to do the transcriptions quickly and inexpensively, has resulted in several databases that are generally available and suitable for building recognition models that until recently would have been impossible. An example is a successful attempt to build a huge acoustic model using full covariances for tens of thousands of Gaussian components. To build that model all the available speech training data in the EARS program from the Switchboard database was used.

The availability of large databases has yet to provide speech recognition to an optimal level. What is needed in the art are improved approaches of providing speech recognition given the availability of large databases.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Embodiments of the invention relate to systems, methods and computer readable media related to speech processing. Method embodiments will be provided by way of summary and example.

One embodiment relates to a method of performing speech recognition wherein the method comprises receiving an utterance, applying the utterance to a recognizer with a language model having pronunciation probabilities associated with unique word identifiers for words given their pronunciations and presenting a recognition result for the utterance.

Another embodiment relates to a method of approximating transcribed speech wherein the method comprises transcribing some speech by a plurality of speakers, producing a pronunciation model for each of the plurality of speakers and passing all text training data through each produced pronunciation model to generate a plurality of speaker dependent phonemic transcription based datasets.

Finally, another embodiment relates to a method of generating a model for use in speech recognition wherein the method comprises selecting a word cluster based on salience to a task to be achieved in a spoken dialog and generating a model for use in speech recognition based on the selected word cluster. The word cluster may be a single word, two words, a phrase, or more than two words and may be treated as a two phoneme word.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates a comparison between higher order n-gram models and merging multiple lexical items into longer span single lexical items;

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention provides for several embodiments related to speech processing. Each embodiment may relate to a method, system, or computer-readable medium controlling a computing device to practice the steps of the invention. One embodiment relates to moving the pronunciation model from a pronunciation dictionary to a language model and how that improves recognition. Another embodiment relates to using salience as a criterion for generating word clusters and yet another embodiment relates to preparing enough training data to practice the other embodiments.

Speech recognition systems are conventionally broken up into phonemic acoustic models, pronouncing dictionaries in terms of the phonemic units in the acoustic model and language models in terms of lexical units from the pronouncing dictionary. The present disclosure explores a new method for incorporating pronunciation probabilities into recognition systems by moving them from the pronouncing lexicon (dictionary) into the language model. The advantages are that pronunciation dependencies across word boundaries can be modeled including contextual dependencies like geminates or consistency in pronunciation style throughout the utterance. A possible disadvantage is that the number of lexical items grows proportionally to the number of pronunciation alternatives per word and that language models which could be trained using text, now need phonetically transcribed speech or equivalent training data. This potential problem is avoided by only considering the most frequent words and word clusters. Those new lexical items are given entries in the dictionary and the language model dependent on the chosen pronunciation. The consequence is that pronunciation probabilities are incorporated into the language model and removed from the dictionary, resulting in an error rate reduction. Also, the introduction of pronunciation dependent word pairs as lexical items changes the behavior of the language model to approximate higher order n-gram language models, also resulting in improved recognition accuracy.

Given the large databases introduced above with large amounts of collected and transcribed speech, the inventors considered approaches to speech modeling using whole word or short phrase models and thus implicit pronunciation modeling, if not for all the words then certainly for the most frequent types that cover most of the tokens in the training database. In the experiments below the inventors describe the consequences of building such a recognition system, where a lexical item can be a phrase rather than a word, which is spoken with a particular pronunciation. The same switchboard database is used for building the acoustic models as well as for building language models. These language models are entirely built using the transcriptions of the acoustic training data as obtained by forced alignment of the conventional triphonic acoustic model with the manually obtained lexical transcriptions.

Figure 1:
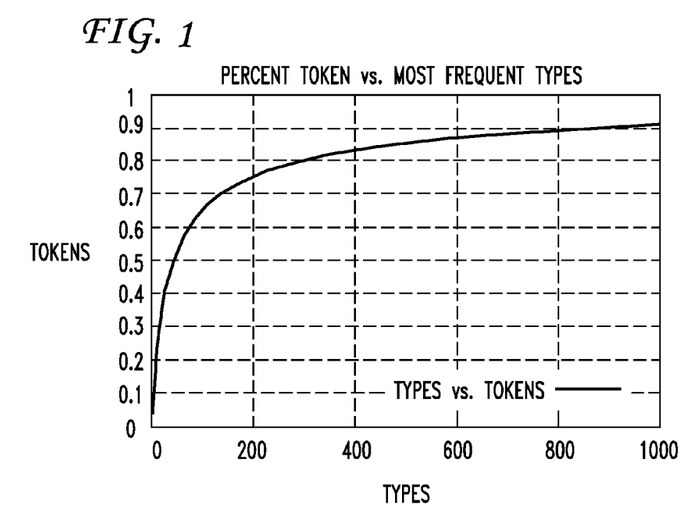
FIG. 1 illustrates a graph of types versus tokens.

Example training data for experiments like the experiments applied by the inventors is the complete set of transcribed switchboard recordings as available for training acoustic models for the EARS-04 evaluation. Those of skill in the art understand this evaluation process. This includes the transcriptions of call home data, switchboard 1 data, switchboard cellular data and the Fisher switchboard data. This totals 23.5 million words of text and about 2200 hours of speech. One of the peculiarities of most conversational speech transcriptions is that some words are much more frequent than others, more so than in other types of collections like Broadcast News or the Wall Street Journal. This means that a few types (lexical items) make up most of the training data (lexical tokens). This can easily be seen in the graph 100 of FIG. 1, which shows a few words (types) occur frequently so that the most frequent 1,000 types (out of more than 60,000) represent 90% of all tokens. Before moving on to more details of the various embodiments of the invention, the disclosure next discusses the basic system hardware components that may be used.

Figure 2:
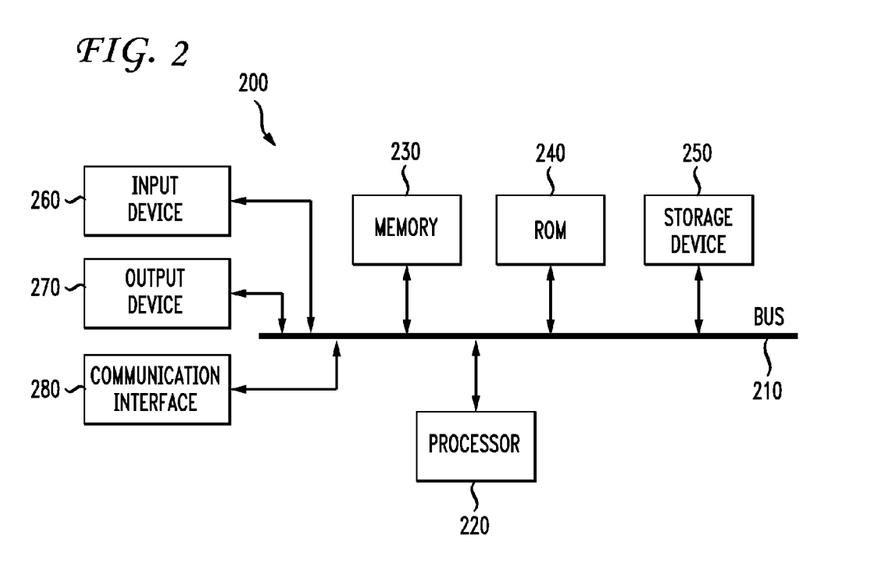
FIG. 2 illustrates a system embodiment of the invention.

FIG. 2 illustrates an exemplary processing system 200 in which one or more of modules practicing the various steps disclosed herein may be implemented. Thus, system 200 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Where the inventions disclosed herein relate to an output voice, the output device may include a speaker that generates the audible sound or prerecorded sounds representing the computer-synthesized speech.

Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, motion input, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when a spoken dialog system is implemented completely within a single processing system 200.

System 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Now, the disclosure continues with further details about the various embodiments of the invention. The training data is processed with preserving the chosen pronunciation for each word, including the "silence" word, which can also have multiple pronunciations. The most frequent 100 word/pronunciation pairs are given special lexical labels. There is nothing special about the selection of 100 pairs that are given special lexical labels, any number may do. In practice, they are the lexical entry with the pronunciation suffix, an integer representing which pronunciation is associated with the lexical entry. All the other words in the lexicon are left unchanged.

The top 100 words were selected as a reasonable compromise between the amount of available data for each word, the complexity of the acoustic model and the tokens' coverage by the most frequent types. In the 100 most frequent types there were 10 words with multiple pronunciations, one with as many as four pronunciations. In addition to those multiple pronunciation examples there were an additional seven words whose most frequent pronunciation was in the top 100 word pronunciations, while the remaining pronunciation(s) did not get a special treatment but are nevertheless preserved in the dictionary as conventional words with all the pronunciations excluding the one which is contained as one of the 100 most frequent word pronunciations. This makes a total of 17 words whose pronunciation probabilities (when used) could be explicitly provided in the dictionary or alternatively combined with language model probabilities in the language model. The number of words that may be combined with the language model may be any number and 17 is simply chosen given the data and circumstances around the experiment. Therefore, there should be no restriction on how many words are used unless explicitly claimed. In the experimental results described later it will be important to notice where those alternative pronunciations were left in the lexicon and where the language model reflects the word pronunciation probability as part of the n-gram probabilities. In other words, there are two important components to the pronunciation models, which pronunciation alternatives to preserve in the dictionary, and which probability should be associated with those pronunciations. Similar treatment of alternative pronunciations has also been applied on up to 240 most frequent word pairs which did not include the silence word. When a silence is inserted between the words in a frequent word bigram, the silence was treated as a lexical item and word pairs which included the word "silence" were ignored. In the top 240 bigrams there were 15 word pairs with two alternative pronunciations and one with three pronunciations. Most of the words making up the 240 most frequent bigrams were included in the 100 most frequent words.

Any numbers expressed herein, such as the numbers above regarding the number of words and number of bigrams and trigrams or any particular number of most frequent words are merely provided for example only and not to limit the invention. For example, where in the experiments 17 words were used who pronunciation probabilities could be provided either in the dictionary explicitly or moved to the language model, any number may do. The number of words in word cluster may be a single word, bigram, trigram, quadrigram, and so forth.

Figure 8:
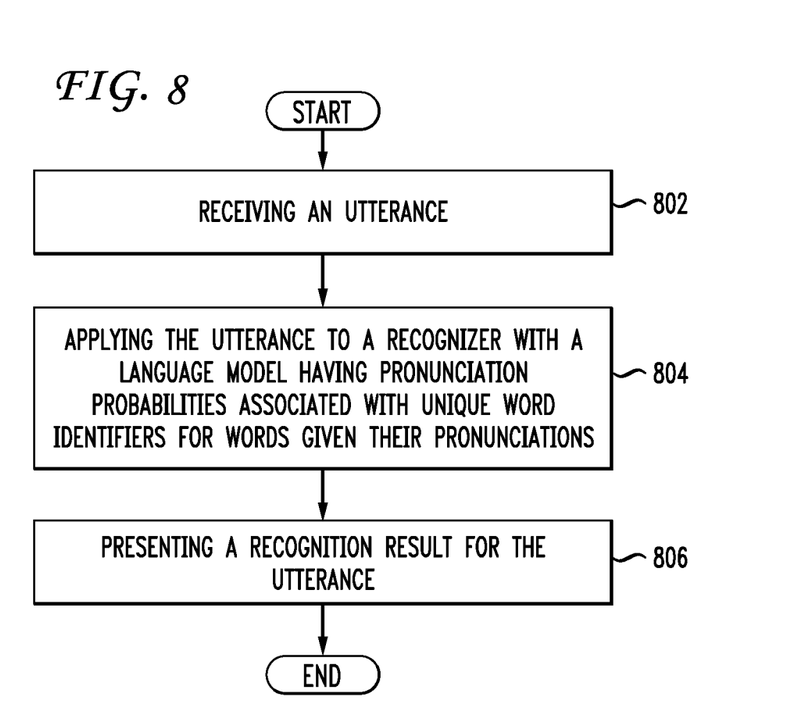
FIG. 8 illustrates a method embodiment of the invention.

An example method of an embodiment of the invention is shown in FIG. 8. This figure illustrates a method of performing speech recognition. The method comprises receiving an utterance (802), applying the utterance to a recognizer with a language model having pronunciation probabilities associated with unique word identifiers for words given their pronunciations (804) and presenting a recognition result for the utterance (806). The language model is generated by modeling pronunciation dependencies across word boundaries and may include generating the language model by including contextual dependencies and/or consistency in pronunciation style throughout the utterance. This consistency in pronunciation style throughout the utterance is a byproduct of having lexemes be dependent on particular pronunciations. A lexeme may refer to an individual entry in the lexicon. A lexeme may be considered as a pairing of a particular orthographic and phonological form with some form of symbolic meaning representation.

In some cases, where the pronunciation probabilities are incorporated into the language model they are also removed from a pronunciation dictionary. When the pronunciation probabilities are added to the language model it may also involve using pronunciation dependent word pairs as lexical items that change the behavior of the language model to approximate higher order n-gram language models. These features enable the language model to use wide contexts in determining a probability of observing a particular realization associated with the utterance. In one aspect, the pronunciation probabilities comprise a set of most frequent words each with at least one pronunciation alternative that were moved from a dictionary to the language model.

Both word and pronunciation dependencies may be modeled across word boundaries. The language model in this aspect does not change its primary function but the language model is given another function to its responsibilities in speech processing.

The pronunciation probabilities in the language model may further comprise pronunciation dependent word pairs as lexical items that change the behavior of the language model to approximate higher order n-gram language models. Having the pronunciation probabilities in the language model provides for wide context pronunciation modeling which enables the determination of a probability of observing a particular word with a particular pronunciation based on a long-word/pronunciation history. One aspect provides for the pronunciation probabilities to comprise a set of most frequent words each with more than one pronunciation alternative. The more than one pronunciation alternative may be in the language model.

Next the disclosure discusses single word pronunciations. Some results discussed herein were based on an identical acoustic model, using a conventional phoneme set, a typical front end and a triphonic tied state model structure. The model is trained using 60-dimensional features obtained by concatenating 9 frames of 13 dimensional MFCC cepstra reduced to 60 features by LDA and de-correlated using a single semi-tied covariance. The model used 9300 tied states to represent more than 25,000 triphonic 3-state left-to-right HMMs. The triphonic context classes were determined using decision trees. All the differences in experimental results are the result of the differences in the implementation of pronunciation probabilities and the effect of combining lexical entries into longer span entries on the language model.

All the experiments were run on Xeon 2.4 GHz processors on the Switchboard evaluation data from 2002, which included Switchboard 1, Switchboard 2 and Switchboard cellular data in equal amounts. The baseline results used transcription based statistics to determine the probability of pronunciation alternatives for the 100 most frequent types. There are 10 words whose pronunciation alternatives are included in the top 100 word pronunciations. There are an additional 7 words whose most frequent pronunciation is included in the top 100, while the rest of them are not. Nevertheless, in the rest of the experiments it will be seen that as the 100 most frequent pronunciations are given a separate lexical entry, it will still constitute pronunciation modeling for those words when the pronunciation probabilities are incorporated as part of the language model. The performances with no pronunciation probabilities, pronunciation probabilities for the 10 most frequent words, and 17 most frequent words with alternative probabilities incorporated within the dictionary are shown in the graph 300 of FIG. 3. The language model used in these experiments was trained on the lexical transcriptions of the acoustic training data, with only a single type for each word which had multiple pronunciations in the dictionary.

Adding pronunciation probabilities to the lexicon is an improvement, when the acoustic model was trained with those alternatives. Recognition accuracy improved even when only a handful of words have pronunciation alternatives especially if they are some of the most frequent words.

Figure 3:
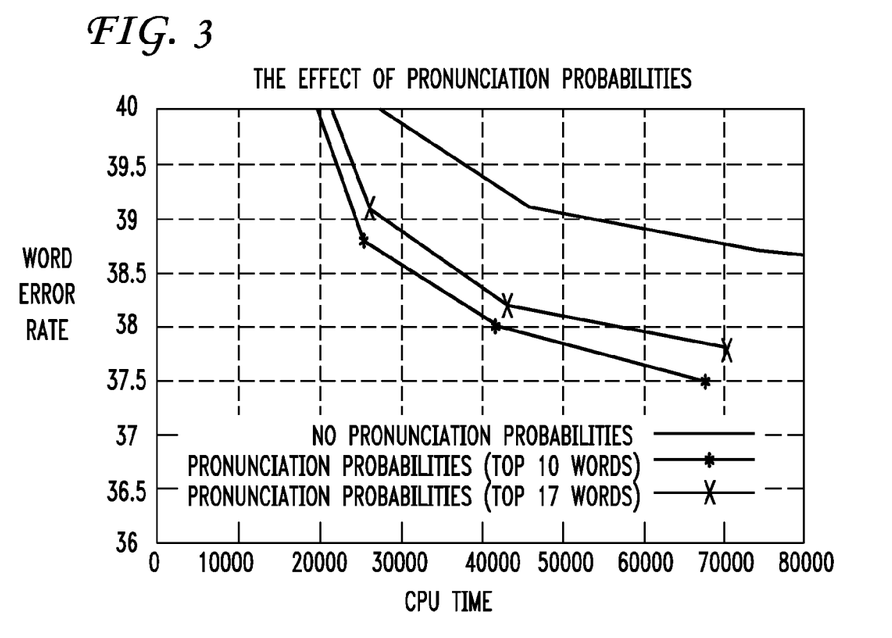
FIG. 3 illustrates the effect of providing pronunciation probabilities.
Figure 4:
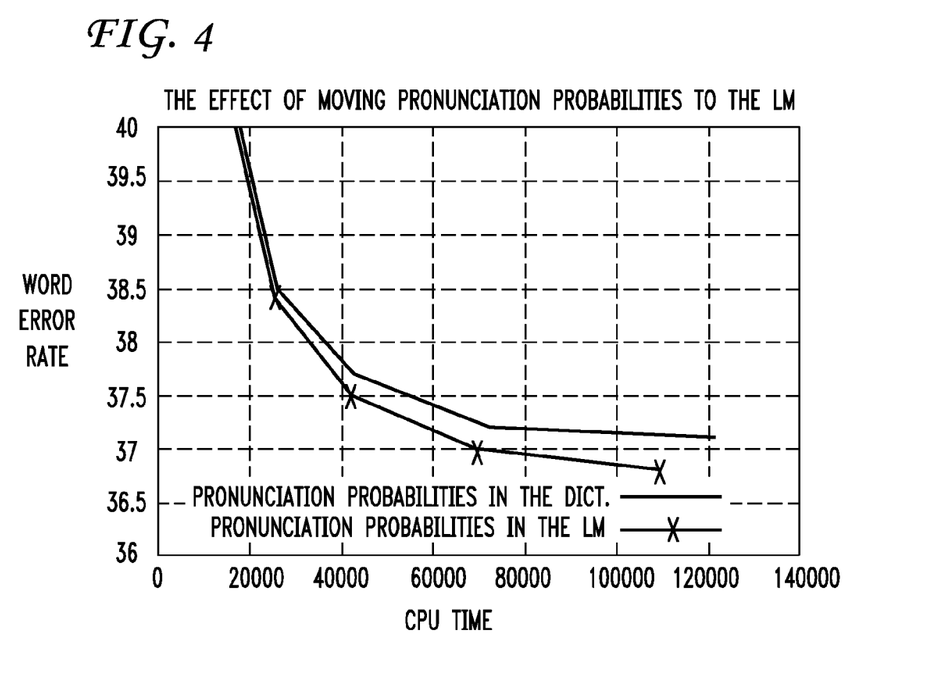
FIG. 4 illustrates the effect of moving pronunciation probabilities from the dictionary into the language model.

The next set of results used a different lexical representation than the previous experiments, so direct comparison to the results in FIG. 3 is not possible. However it will be possible to compare what happens when it is not dictionary that contains the pronunciation probabilities, but the lexicon contains unique entries for each pronunciation variant thus moving pronunciation probabilities from the dictionary into the language model. This comparison is shown in the graph 400 of FIG. 4. which shows the effect of moving pronunciation probabilities for the most frequent 17 words with pronunciation alternatives from the dictionary to the language model.

It is clear that it is advantageous to allow the language model to extract all the available information from the fact that some words commonly have different pronunciations. In addition to exploiting geminates, which is not easy through pronunciation modeling within a dictionary, the distinction between common variants where the reduction in a vowel determines the difference between the verb and the noun type (eg. reset /r ax s eh t/ vs. /r iy s eh t/ respectively) could also significantly contribute to performance improvements. In the past it was discovered that elaborate pronunciation models with many alternatives per word were in fact not performing pronunciation modeling, but were in fact allowing context dependent models to automatically form speaker clusters. Shifting those models into the language model allows for the constraint of staying within the same cluster throughout the utterance, which was not possible to enforce, explicitly or implicitly as it would be with longer span constraints of n-gram language models.

Next is discussed another embodiment related to word cluster pronunciation where the inventors investigated the consequences of combining words into new longer lexical items in the language model. When two words are merged to form a new lexical item (e.g. "I know" becomes "I_know"), then it implicitly increases the context of the n-gram type language model. This is often done with acronyms, so that context is not entirely lost (e.g. "A. T. & T." would become "A._T._&_T."). In this case it is done on the most frequent word pronunciation pairs, starting from none and trying up to 240 most frequent pairs. The training data is otherwise identical, as is the method for building the language model. The only difference is the transformation of word (pronunciation specific) pairs into a single word, which is also pronunciation specific. The largest number of pairs tried was 240 which included 17 pairs with more than one pronunciation. In other words, there were 223 word pairs, with 16 pairs having 2 alternative pronunciations and one having three. It is important to note that the 223 word bigrams whose 240 alternative pronunciations make up the most frequent word pronunciation pairs have in principle a total of 399 possible pronunciations, given the alternatives in the dictionary for individual words that make up the most frequent word pairs. The benefit is similar to using bigram language models instead of unigram language models.

Figure 9:
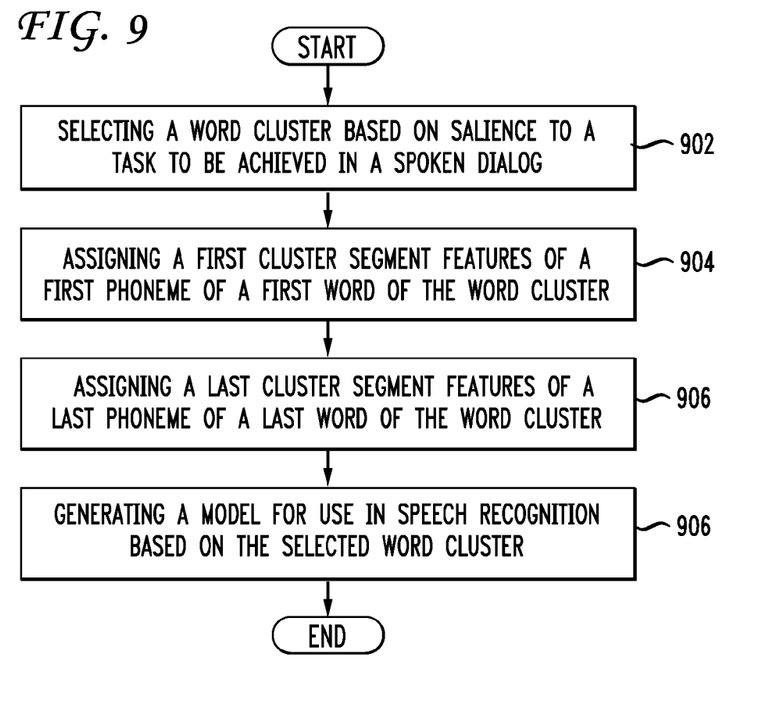
FIG. 9 illustrates another method embodiment of the invention.

The word cluster aspect of the invention is shown in FIG. 9 which discloses a method of generating a model for use in speech recognition. The method comprises selecting a word cluster based on salience to a task to be achieved in a spoken dialog (902), assigning a first cluster segment features of a first phoneme of a first word of the word cluster (904), assigning a last cluster segment features of a last phoneme of a last word of the word cluster (906) and generating a model for use in speech recognition based on the selected word cluster (908). The model may be at least one of a language model, an acoustic model and a pronunciation model. The word cluster may be a word pair, a single word, more than two words or a phrase. The word cluster may be treated as a two phoneme word. The model may be a bigram model, trigram model and so forth. The word cluster may be bi-phonic wherein the first segment is an initial segment that has a plurality of left contexts and only one right context, and the last phoneme has only one left context and a plurality of right contexts. The word cluster may be utilized as the unit for language model training or may become a lexeme/pronunciation pair for use in pronunciation dependent language models.

The selected word cluster may be used for several functions. For example, the selected word cluster may be used to build an acoustic unit corresponding to the selected word cluster. A lexeme may be created for use in a language model based on the selected salient word cluster as well as a combined pronunciation probability may be created for the word cluster.

The merged words or phrases may be one of: two words or portions of words or more than two words. The salient merged words may be salient because they relate to words of importance to a particular task and are applied in the context of speech recognition. For example, using salience as a criterion for selecting language model word clusters relates to identifying words that help to perform a task. The introduction "hello" is unlikely to be salient where it does not relate to a task such as obtaining an account balance, or receiving a refund. The merged words preferably comprise a word cluster of one or more words having a first acoustic unit to model a beginning of the word cluster and a second acoustic unit to model the end of the word cluster. The first and second acoustic units enable feature-based tree context clustering of acoustic units. The first acoustic unit may be associated with phonetic features of an initial phoneme in the word cluster and second acoustic unit may be associated with phonetic features of a last phoneme of the word cluster. In one aspect, the first acoustic unit and the second acoustic unit are only seen together such that one of their contexts is always known and does not need to be modeled. An advantage is that because the merged words are two or more merged words, the language model allows for context dependency to the context and provides phonemic context modeling within the merged words.

The concept of using short phrases as lexical items where the criteria is salience to a particular task one is performing using ASR has several useful features. For example, acoustic units may be built using the phrase, lexemes may be created for use in language models based on the salient phrases and a combined pronunciation probability for the phrase may be created. Furthermore, although frequency of occurrence may be used as well, given a particular task, salience may be attributed to phrases and words and be used as the criterion for all three parts of the ASR family of models.

The steps of assigning a first cluster segment features of a first phoneme of a first word of the word cluster and assigning a last cluster segment features of a last phoneme of a last word of the word cluster enable the treatment of a whole word cluster as if it had only two phonemes—a cluster beginning phoneme (or initial cluster segment) and a cluster ending phoneme (or ending cluster segment). This provides the advantage that all the standard acoustic modeling tools work as if the cluster was just another two-phoneme word. The context dependency is done appropriately if the features of the initial cluster segment is assigned features of the first phone of the word of the cluster and the final cluster segment is assigned the features of the last phoneme of the last word in the cluster.

Since the cluster beginning and ending only ever occur together their triphonic context dependency is in reality only bi-phonic—the initial one has many left contexts, but only one right context, and the final segment has only one left context (the initial segment) and many right contexts. This is just an implementation issue for cluster dependent acoustic models and is independent of choosing the method for selecting which clusters to give the special treatment. When applying salience to select word clusters for the special treatment, the special treatment may be a cluster unique acoustic model which can be conveniently implemented.

Figure 5:
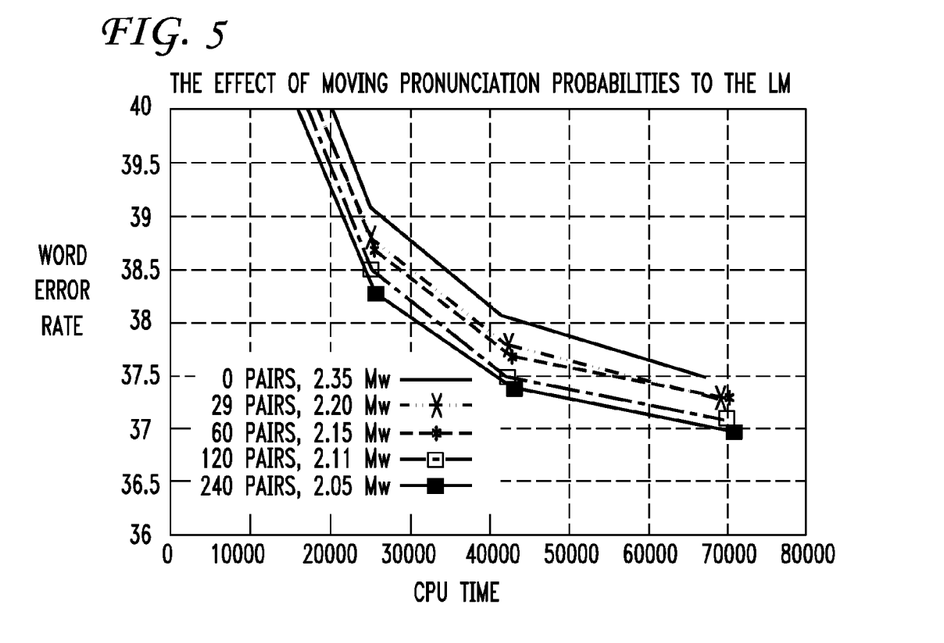
FIG. 5 illustrates the effect of converting word pronunciation pairs into single lexical terms for language modeling.
Figure 6:
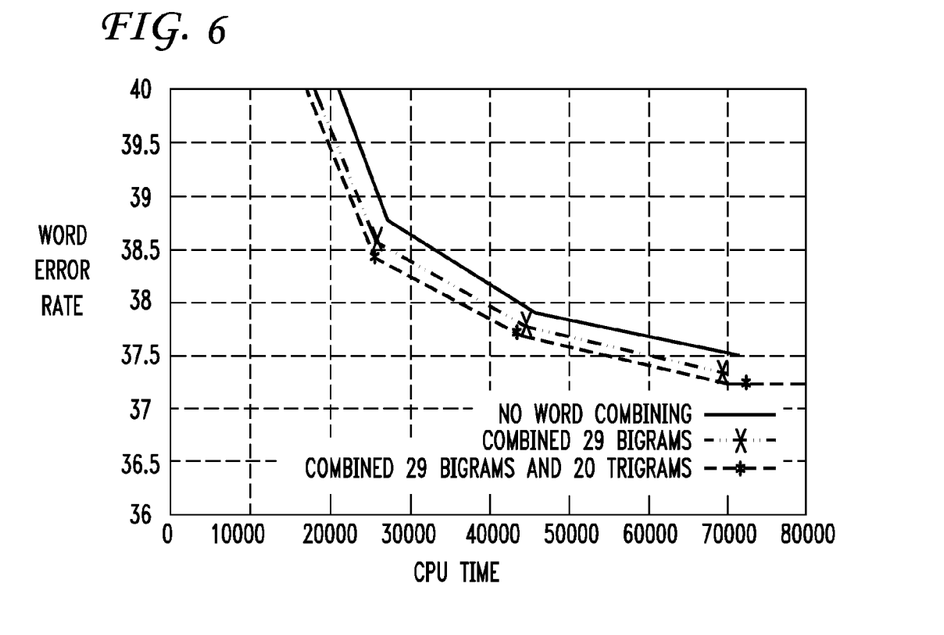
FIG. 6 illustrates the effect of converting word pronunciation triples into single lexical items for language modeling.

The result of experiments for 29, 60, 120 and 240 pairs is shown in the graph 500 of FIG. 5, which shows the effect of converting word pronunciation pairs into single lexical items for language modeling. For each of the conditions in FIG. 5, the total number of lexical items is also shown in millions of words (Mw), indicating how frequent are the most frequent pronunciation pairs. Another experiment was conducted by adding the most frequent pronunciation triples (effectively the same as adding word trigrams), and despite their low frequency of occurrence, it still resulted in a modest performance improvement, as shown in the graph 600 of FIG. 6. This figure shows the effect of converting word pronunciation triples into single lexical items for language modeling.

One question relates to how does the merging of words or pronunciation variants into longer span lexical entries, and consequent expansion of the n-gram span, compare to simply using higher order n-gram models. In all the experiments above a simple trigram with a shrink of zero was used. The inventors compared that with quadrigram and quintagram models with different shrink values. The results are shown in the graph 700 of FIG. 7, which illustrates a comparison between higher order n-gram models and merging multiple lexical items into longer span single lexical items for language modeling.

Although FIG. 7 is too crowded to compare the different language models it is clear that either higher order n-gram models or the trigram language model with 240 pronunciation merges perform equally well and all perform significantly better than the baseline trigram LM, and that the quadrigram model with 240 pronunciation merges performs even better. Although the Switchboard acoustic training database is considered very large, its transcriptions make up but a small language modeling database, and that might be the reason why the differences between the different higher order n-gram language models is so negligible.

Figure 10:
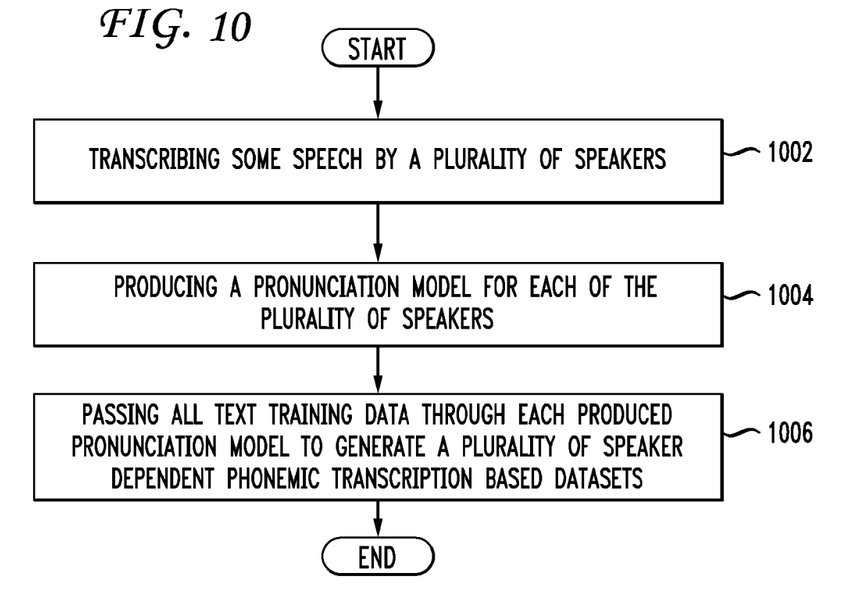
FIG. 10 illustrates yet another method embodiment of the invention.

As mentioned above, another embodiment relates to the need of a lot of training data comprising phonetically transcribed speech to train pronunciation dependent language models. Generally, there exists only a small amount of data to train LMs (there is generally much less available transcribed speech than text). Therefore, this embodiment relates to a method, shown in FIG. 10, to approximate large quantities of transcribed speech and provides for transcribing some speech by a plurality of speakers (1002). An underlying database such as the Switchboard already exists that has a few minutes of speech by a few thousand speakers, the NAB has several minutes by a couple of thousand speakers, etc. Next, the method comprises producing a pronunciation model for each of the plurality of speakers (1004) and passing all text training data through each produced pronunciation model to generate a plurality of speaker dependent phonemic transcription based datasets (1006). In one aspect of this process, the system creates a large body of text with matching pronunciations which are consistent throughout the utterance. The creation of the large body of text within matching pronunciations which are consistent through the utterance is essentially a product of the steps set forth in FIG. 10. The process of generating a plurality of speaker dependent phonemic transcription based datasets occurs with the plurality of pronunciation models in a generative mode. The speaker dependent phonemic transcription based datasets may include word and pronunciation notations. A single pronunciation dependent language model based on the plurality of speaker dependent phonemic transcription based datasets may be built and which will also reflect dependencies of the pronunciation model for each of the plurality of speakers.

As an example of how the above process works, assume that there are 10 speakers and speech from each speaker is transcribed to generate 10 pronunciation models. The training text is passed through the models and 10 sets of data with word/pronunciation notations are created. All 10 sets were used to build one pronunciation dependent language model. The dependencies in the language model will reflect the dependencies of individual pronunciation models, but will contain off all of them. Consider a pronunciation model by speakers that typical pronounces stops by: flapping, glottalizing, aspirating or deleting. Those of skill in the art will understand the physical and audio effects of each of these approaches. Then the problem of a word given one of the four types of pronunciation model will depend on whether the previous word was realized by the speaker that flaps, glottalizes, etc. The building of the language model combines the features of all the pronunciation models. The number of sets used to build the pronunciation dependent language model is not an element of the invention but an example of how many could be used in between 3 and 10. Typically, only a few pronunciation models may be sufficient and many speakers could be clustered into a set of say 3-10 types, and thus 3-10 pronunciation models would be built.

These models may be very elaborate and even undertrained as they will eventually be combined with all the other pronunciation models. This process artificially creates a large body of text with matching pronunciations which would be consistent throughout the utterance. Other steps associated with this embodiment may include creating a large body of text with matching pronunciations which are consistent throughout the utterance and generating the plurality of speaker dependent phonemic transcription based datasets by using the plurality of pronunciation models in a generative mode.

The first consequence is that lexical items become pronunciation dependent and that pronunciation modeling becomes the provenance of the language model and not the dictionary any more. This allows for better modeling of coarticulation and part-of-speech differences in pronunciation, resulting in a modest gain using a modest number of thus modeled pronunciations, on a total of 17 words in a vocabulary of over 60,000 words. Such transfer from the dictionary to the language model can be performed for all of the words in the dictionary, with expectations of similar improvements, given adequate training data.

The issue of sufficient training data could be overcome by creating speaker-specific pronunciation models and using them to transform lexical data into many speaker dependent phonemic transcription based datasets by using the pronunciation models in the generative mode.

Merging words into longer lexical items (phrases), has the beneficial consequence of changing the behavior of lower order n-gram models to be more like one or two orders higher n-gram models (trigram behaves like quadrigram or quintagram models), which might make a significant difference for some recognition decoder architectures. This improvement appears to hold even when the amount of the language modeling training data is significantly reduced to match the amount of the acoustic training data.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
   approximating transcribed speech, via a processor, using a phonemic transcription dataset associated with a speaker, to yield a language model, where the phonemic transcription dataset is based on a pronunciation model of the speaker;
   incorporating, into the language model, pronunciation probabilities associated with respective unique labels for each different pronunciation of a word, wherein the respective unique label for a most frequent word indicates a special status in the language model; and
   after incorporating the pronunciation probabilities into the language model, recognizing an utterance using the language model.

2. The method of claim 1, further comprising:
   removing the pronunciation probabilities from a pronunciation dictionary.

3. The method of claim 1, wherein the language model is generated by modeling pronunciation dependencies across word boundaries.

4. The method of claim 1, wherein one of contextual dependencies and consistency in pronunciation style exist throughout the utterance.

5. The method of claim 1, wherein the pronunciation probabilities in the language model further comprise pronunciation dependent word pairs as lexical items that change a behavior of the language model to approximate higher order n-gram language models.

6. The method of claim 1, further comprising:
   creating a wide context pronunciation model based on having the pronunciation probabilities in the language model; and
   determining a probability of observing a particular word in the utterance using the wide context pronunciation model.

7. The method of claim 1, wherein the pronunciation probabilities comprise a set of most frequent words each with more than one pronunciation alternative.

8. The method of claim 7, wherein the more than one pronunciation alternative is in the language model.

9. A system comprising:
   a processor; and
   a computer-readable storage medium having instructions stored which, when executed on the processor, cause the processor to perform operations comprising:
     approximating transcribed speech using a phonemic transcription dataset associated with a speaker, to yield a language model, where the phonemic transcription dataset is based on a pronunciation model of the speaker;
     incorporating, into the language model, pronunciation probabilities associated with respective unique labels for each different pronunciation of a word, wherein the respective unique label for a most frequent word indicates a special status in the language model; and after incorporating the pronunciation probabilities into the language model, recognizing an utterance using the language model.

10. The system of claim 9, wherein the computer-readable storage medium has additional instructions stored which result in the operations further comprising:
removing the pronunciation probabilities from a pronunciation dictionary.

11. The system of claim 9, wherein the language model is generated by modeling pronunciation dependencies across word boundaries.

12. The system of claim 9, wherein one of contextual dependencies and consistency in pronunciation style exist throughout the utterance.

13. The system of claim 9, wherein the pronunciation probabilities in the language model further comprise pronunciation dependent word pairs as lexical items that change a behavior of the language model to approximate higher order n-gram language models.

14. The system of claim 9, the computer-readable storage medium having additional instructions stored which result in the operations further comprising:
creating a wide context pronunciation model based on having the pronunciation probabilities in the language model; and
determining a probability of observing a particular word in the utterance using the wide context pronunciation model.

15. The system of claim 9, wherein the pronunciation probabilities comprise a set of most frequent words each with more than one pronunciation alternative.

16. The system of claim 15, wherein the more than one pronunciation alternative is in the language model.

17. A computer-readable storage device having instructions stored which, when executed on a processor, cause the processor to perform operations comprising:
approximating transcribed speech using a phonemic transcription dataset associated with a speaker, to yield a language model, where the phonemic transcription dataset is based on a pronunciation model of the speaker;
incorporating, into the language model, pronunciation probabilities associated with respective unique labels for each different pronunciation of a word, wherein the respective unique label for a most frequent word indicates a special status in the language model; and
after incorporating the pronunciation probabilities into the language model, recognizing an utterance using the language model.

18. The computer-readable storage device of claim 17, the computer-readable storage device having additional instructions stored which result in the operations further comprising:
removing the pronunciation probabilities from a pronunciation dictionary.

19. The computer-readable storage device of claim 17, wherein the language model is generated by modeling pronunciation dependencies across word boundaries.

20. The computer-readable storage device of claim 17, wherein one of contextual dependencies and consistency in pronunciation style exist throughout the utterance.

* * * * *